United States Patent
Ohmoto

(10) Patent No.: US 10,936,515 B2
(45) Date of Patent: Mar. 2, 2021

(54) INFORMATION PROCESSING SYSTEM INCLUDING DATA CLASSIFICATION UNIT FOR RECONSTRUCTING TRANSFER DATA BASED ON DEFINED TRANSFER CODES

(71) Applicant: NEC Platforms, Ltd., Kawasaki (JP)

(72) Inventor: Yoshihisa Ohmoto, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/478,214

(22) PCT Filed: Jan. 19, 2018

(86) PCT No.: PCT/JP2018/001496
§ 371 (c)(1),
(2) Date: Jul. 16, 2019

(87) PCT Pub. No.: WO2018/139344
PCT Pub. Date: Aug. 2, 2018

(65) Prior Publication Data
US 2019/0370196 A1 Dec. 5, 2019

(30) Foreign Application Priority Data

Jan. 24, 2017 (JP) .............................. JP2017-009986

(51) Int. Cl.
*G06F 13/20* (2006.01)
*G06F 13/42* (2006.01)
(52) U.S. Cl.
CPC .......... *G06F 13/20* (2013.01); *G06F 13/4204* (2013.01)
(58) Field of Classification Search
CPC ..................................................... G06F 13/20
See application file for complete search history.

(56) References Cited

U.S. PATENT DOCUMENTS 5,584,041 A * 12/1996 Odawara ............... G06F 13/124
710/14
7,274,696 B1 * 9/2007 Sikdar ..................... H04L 45/60
370/351

(Continued)

FOREIGN PATENT DOCUMENTS

JP H04-364558 A 12/1992
JP H05-216792 A 8/1993

(Continued)

OTHER PUBLICATIONS

International Search Report for PCT Application No. PCT/JP2018/001496, dated Feb. 20, 2018.

(Continued)

*Primary Examiner* — Tammara R Peyton

(57) ABSTRACT

An information processing system equipped with an information processing device, which includes multiple processors and a common parallel port (port), and a peripheral device, which includes a data classification means and multiple computing means. Each processor appends each processor identifier to a respective series of codes capable of expressing given data, thereby generating a writing unit capable of being written one time in the bus width of the port, and sequentially writes the writing unit to the port without performing exclusive control. A data classification means reads the writing units from the port sequentially and sequentially outputs the series of codes included in the writing unit to a computing means associated with the processor identifiers included in the writing unit. The computing means reconstructs the original data on the basis of the series of codes.

14 Claims, 12 Drawing Sheets

(56) References Cited

U.S. PATENT DOCUMENTS

| | | | | |
|---|---|---|---|---|
| 7,660,912 B2* | 2/2010 | Gregg | ................... | G06F 13/12 |
| | | | | 710/5 |
| 8,804,751 B1* | 8/2014 | Poole | ................... | H04L 45/021 |
| | | | | 370/412 |
| 2008/0040523 A1 | 2/2008 | Bruce | | |
| 2008/0147891 A1* | 6/2008 | Gregg | ................... | G06F 13/12 |
| | | | | 710/5 |

FOREIGN PATENT DOCUMENTS

| | | |
|---|---|---|
| JP | H07-168768 A | 7/1995 |
| JP | 2008-041099 A | 2/2008 |
| JP | 2008-102921 A | 5/2008 |
| JP | 2009-087189 A | 4/2009 |

OTHER PUBLICATIONS

English translation of Written opinion for PCT Application No. PCT/JP2018/001496.

* cited by examiner

Fig.8

| TIMING | RECEPTION SIGNAL | COUNTER 0 | COUNTER 1 | COMPUTING UNIT 00 | COMPUTING UNIT 10 |
|---|---|---|---|---|---|
| 0 |  | 0 | 0 |  |  |
| 1 | P0, S | 1 | 0 |  |  |
| 2 | P1, S | 1 | 1 |  |  |
| 3 | P1, D10 | 1 | 1 | — | — |
| 4 | P0, D00 | 1 | 1 | $D00 \times 3^0$ | $D10 \times 3^0$ |
| 5 | P1, D11 | 1 | 1 | $D00 \times 3^0$ | $D10 \times 3^0$ |
| 6 | P0, D01 | 1 | 1 | $D00 \times 3^0 + D01 \times 3^1$ | $D10 \times 3^0 + D11 \times 3^1$ |
| 7 | P0, D02 | 1 | 1 | $D00 \times 3^0 + D01 \times 3^1 + D02 \times 3^2$ | $D10 \times 3^0 + D11 \times 3^1$ |
| 8 | P1, D12 | 1 | 1 | $D00 \times 3^0 + D01 \times 3^1 + D02 \times 3^2$ | $D10 \times 3^0 + D11 \times 3^1$ |
| 9 | P1, D13 | 1 | 1 | $D00 \times 3^0 + D01 \times 3^1 + D02 \times 3^2$ | $D10 \times 3^0 + D11 \times 3^1 + D12 \times 3^2$ |
| 10 | P0, D03 | 1 | 1 | $D00 \times 3^0 + D01 \times 3^1 + D02 \times 3^2 + D03 \times 3^3$ | $D10 \times 3^0 + D11 \times 3^1 + D12 \times 3^2 + D13 \times 3^3$ |
| 11 | P1, D14 | 1 | 1 | $D00 \times 3^0 + D01 \times 3^1 + D02 \times 3^2 + D03 \times 3^3$ | $D10 \times 3^0 + D11 \times 3^1 + D12 \times 3^2 + D13 \times 3^3$ |
| 12 | P0, D04 | 1 | 1 | $D00 \times 3^0 + D01 \times 3^1 + D02 \times 3^2 + D03 \times 3^3 + D04 \times 3^4$ | $D10 \times 3^0 + D11 \times 3^1 + D12 \times 3^2 + D13 \times 3^3 + D14 \times 3^4$ |
| 13 | P0, D05 | 0 | 1 | $D00 \times 3^0 + D01 \times 3^1 + D02 \times 3^2 + D03 \times 3^3 + D04 \times 3^4 + D05 \times 3^5$ | $D10 \times 3^0 + D11 \times 3^1 + D12 \times 3^2 + D13 \times 3^3 + D14 \times 3^4$ |
| 14 | P1, D15 | 0 | 0 | $D00 \times 3^0 + D01 \times 3^1 + D02 \times 3^2 + D03 \times 3^3 + D04 \times 3^4 + D05 \times 3^5$ | $D10 \times 3^0 + D11 \times 3^1 + D12 \times 3^2 + D13 \times 3^3 + D14 \times 3^4 + D15 \times 3^5$ |

Fig.9

| TIMING | RECEPTION SIGNAL | COUNTER 0 | COUNTER 1 | COMPUTING UNIT O0 | COMPUTING UNIT O1 |
|---|---|---|---|---|---|
| 0 | | 0 | 0 | | |
| 1 | P0,S | 0 | 0 | — | |
| 2 | P0,D00 | 1 | 0 | $D00 \times 3^0$ | |
| 3 | P0,D01 | 1 | 0 | $D00 \times 3^0 + D01 \times 3^1$ | |
| 4 | P0,D02 | 1 | 0 | $D00 \times 3^0 + D01 \times 3^1 + D02 \times 3^2$ | |
| 5 | P0,S | 2 | 0 | $D00 \times 3^0 + D01 \times 3^1 + D02 \times 3^2$ | — |
| 6 | P0,D10 | 2 | 0 | $D00 \times 3^0 + D01 \times 3^1 + D02 \times 3^2$ | $D10 \times 3^0$ |
| 7 | P0,D11 | 2 | 0 | $D00 \times 3^0 + D01 \times 3^1 + D02 \times 3^2$ | $D10 \times 3^0 + D11 \times 3^1$ |
| 8 | P0,D12 | 2 | 0 | $D00 \times 3^0 + D01 \times 3^1 + D02 \times 3^2$ | $D10 \times 3^0 + D11 \times 3^1 + D12 \times 3^2$ |
| 9 | P0,D13 | 2 | 0 | $D00 \times 3^0 + D01 \times 3^1 + D02 \times 3^2$ | $D10 \times 3^0 + D11 \times 3^1 + D12 \times 3^2 + D13 \times 3^3$ |
| 10 | P0,D14 | 2 | 0 | $D00 \times 3^0 + D01 \times 3^1 + D02 \times 3^2$ | $D10 \times 3^0 + D11 \times 3^1 + D12 \times 3^2 + D13 \times 3^3 + D14 \times 3^4$ |
| 11 | P0,D15 | 1 | 0 | $D00 \times 3^0 + D01 \times 3^1 + D02 \times 3^2$ | $D10 \times 3^0 + D11 \times 3^1 + D12 \times 3^2 + D13 \times 3^3 + D14 \times 3^4 + D15 \times 3^5$ |
| 12 | P0,D03 | 1 | 0 | $D00 \times 3^0 + D01 \times 3^1 + D02 \times 3^2 + D03 \times 3^3$ | |
| 13 | P0,D04 | 1 | 0 | $D00 \times 3^0 + D01 \times 3^1 + D02 \times 3^2 + D03 \times 3^3 + D4 \times 3^4$ | |
| 14 | P0,D05 | 0 | 0 | $D00 \times 3^0 + D01 \times 3^1 + D02 \times 3^2 + D03 \times 3^3 + D04 \times 3^4 + D05 \times 3^5$ | |

INFORMATION PROCESSING SYSTEM INCLUDING DATA CLASSIFICATION UNIT FOR RECONSTRUCTING TRANSFER DATA BASED ON DEFINED TRANSFER CODES

This application is a National Stage Entry of PCT/JP2018/001496 filed on Jan. 19, 2018, which claims priority from Japanese Patent Application 2017-009986 filed on Jan. 24, 2017, the contents of all of which are incorporated herein by reference, in their entirety.

TECHNICAL FIELD

The present invention relates to a technology of transferring data from an information processing device including a plurality of processors and a common parallel port to be shared by the plurality of processors to a peripheral device.

BACKGROUND ART

A basic input/output system (BIOS) included in a computer such as a server performs a power on self test (POST), when the computer is powered on. When an event such as an error occurs in a POST, a BIOS outputs, for example, a POST code being a number indicating a specific error or state. A BIOS outputs, for example, a POST code to an input/output (I/O) port associated with a certain address. A POST code output to an I/O port is acquirable, for example, by connecting a logic analyzer or a POST card to the computer.

Accompanied by improvement on integration in a processor in recent years, an opportunity that a plurality of processors (multiple processors) are mounted in one server has increased. In a server including multiple processors, there is a possibility that a deadlock may occur due to exclusive control or the like with respect to a common resource by each processor. In the present application, it is assumed that "exclusive control" is processing of controlling, when competition occurs by simultaneous accesses from a plurality of processors to a common resource usable by the plurality of processors, another processor not to use the common resource during a time when a certain processor is allowed to exclusively use the common resource. Further, in the present application, it is assumed that a "deadlock" is such that, as a result that processing in each of a plurality of processors waits for processing in another one of the processors, none of the processors is able to complete processing. For confirmation of a status relating to exclusive control with respect to a common resource, a debug device such as an in-circuit emulator (ICE, a registered trademark) is usable. However, as a result that a debug circuit is not prepared in order to reduce a production cost of a computer and the like, it may not be possible to use a debug device.

Also in a server including multiple processors, it is often the case that a POST code is output to an I/O port in order to maintain compatibility with a server including a single processor. When an I/O port is provided for each processor, however, a production cost of a computer may rise. In view of the above, in a server including multiple processors, a POST code may be output to an I/O port to be shared by each processor (hereinafter, referred to as a common I/O port).

Also in a server including multiple processors, it is desirable to acquire a POST code output to a common I/O port by a BIOS included in each processor. Since a common I/O port is also shared by each processor, however, there is a possibility that exclusive control itself with respect to the common I/O port may affect occurrence of a deadlock.

An example of a technology in which a plurality of memory management means access a common memory is disclosed in PTL 1. A data stream analyzing system in PTL 1 includes a data storage means, a plurality of memory management means, one or more memory storage means, and a correspondence storage means.

The memory management means are classified into a common memory management means and a dedicated memory management means. The common memory management means performs a procedure with respect to a memory pool, after performing exclusive control. The dedicated memory management means performs a procedure with respect to a memory pool without performing exclusive control. In the data storage means, memory areas for storing data for analysis are allocated, as a plurality of memory pools. Each of the memory management means has a one-to-one correspondence to any one of the plurality of memory pools. Each of the memory management means individually performs a procedure with respect to one memory pool having a correspondence to the memory management means. The memory storage means is operated independently for each type of data classified in advance. When data being an analysis target are generated, the data are stored in a memory area. The correspondence storage means stores information indicating a correspondence between the memory storage means and the memory management means. When data being an analysis target are generated, the memory storage means stores, in a memory area secured from any of the plurality of memory pools, the data by using a memory management means having a correspondence to the memory storage means.

As a result of the above-described configuration, the data stream analyzing system in PTL 1 secures balance between a utilization ratio of a memory and an execution speed in a data stream analyzing system for sequentially analyzing information that is successively generated.

In the data stream analyzing system in PTL 1, however, there is an issue that it is necessary to perform a procedure with respect to a memory pool, after a common memory management means performs exclusive control.

An example of a technology in which a plurality of processors access a common memory (a shared memory) is disclosed in PTL 2. An inter-processor service request control method in PTL 2 includes a main storage device (a common memory) and a plurality of central processing units (CPUs) (2-1 to 2-n, where n is a natural number), which are connected to a common bus.

In the main storage device, data areas (10-i: i=1 to n) for storing data (k→m) to be transferred from CPU (2-k) to CPU (2-m) (k=1 to n, m=1 to n, and k≠m: k and m are each a natural number) are allocated. Each CPU (2-1 to 2-n) includes interruption request register (3-1 to 3-n). After storing transmission data (k→m) in data area (10-i) of the main storage device, CPU (2-k) generates an interruption to CPU (2-m) and notifies that data are transmitted by writing 1 in k-th bit interruption request register (3-m). CPU (2-m) reads a content of interruption request register (3-m), and checks a on bit. Further, CPU (2-m) transfers data (k→m) from CPU (2-k) to CPU (2-m) by reading data (k→m) associated with k-th bit data transfer area (10-i) of the main storage device.

As a result of the above-described configuration, in the service request control method in PTL 2, a service request delivery between processors is performed without sensing exclusive control of a common memory.

CITATION LIST

Patent Literature

[PTL 1] Japanese Unexamined Patent Application Publication No. 2009-87189
[PTL 2] Japanese Unexamined Patent Application Publication No. H5-216792

SUMMARY OF INVENTION

Technical Problem

In the service request control method in PTL 2, however, an interruption request register of n bits is necessary for each CPU. In other words, in the service request control method in PTL 2, there is an issue that a production cost may rise, as compared with a case where an interruption request register is not present.

In view of the above-described issues, a main object of the present invention is to suppress occurrence of a deadlock due to exclusive control in a common parallel port by an inexpensive configuration, in transferring data from an information processing device including a plurality of processors and a common parallel port to be shared by the plurality of processors to a peripheral device.

Solution to Problem

In one aspect of the invention, an information processing system includes:

an information processing device including a plurality of processors, and a common parallel port to be shared by the plurality of processors; and a peripheral device including data classification means, and computing means of a number equal to or larger than a number of the plurality of processors.

Each of the processors generates a writing unit writable by a one-time operation in a bus width of the common parallel port by appending data representing an identifier of each of the processors (hereinafter, a processor identifier) to each of a series of transfer codes capable of representing transfer target data, and successively writes the generated writing unit in the common parallel port without performing exclusive control in the common parallel port.

The data classification means
successively reads the writing unit from the common parallel port, and
successively outputs, to the computing means associated with data representing the processor identifier included in the read writing unit, the series of transfer codes included in the read writing unit.

And, the computing means re-constructs the transfer target data, based on the series of transfer codes output by the data classification means.

In one aspect of the invention, an information processing device includes:
a plurality of processors; and
a common parallel port to be shared by the plurality of processors.

Each of the processors generates a writing unit writable by a one-time operation in a bus width of the common parallel port by appending data representing an identifier of each of the processors (hereinafter, a processor identifier) to each of a series of transfer codes capable of representing transfer target data, and successively writes the generated writing unit in the common parallel port without performing exclusive control in the common parallel port.

In one aspect of the invention, a peripheral device includes:
data classification means; and
a plurality of computing means.

The data classification means
successively reads, from a common parallel port included in an information processing device including a plurality of processors, and the common parallel port to be shared by the plurality of processors, a writing unit writable by a one-time operation in a bus width of the common parallel port by appending data representing an identifier of each of the processors (hereinafter, a processor identifier) included in the information processing device to each of a series of transfer codes capable of representing transfer target data to be transferred by the information processing device, and
successively outputs, to the computing means associated with data representing the processor identifier included in the read writing unit, the series of transfer codes included in the read writing unit.

And, the computing means re-constructs the transfer target data, based on the series of transfer codes output by the data classification means.

In one aspect of the invention, a data transfer method in an information processing system is provided. The information processing system includes an information processing device and a peripheral device. The information processing device includes a plurality of processors, and a common parallel port to be shared by the plurality of processors. And, the peripheral device includes data classification means, and computing means of a number equal to or larger than a number of the plurality of processors. The method includes:
by each of the processors,
generating a writing unit writable by a one-time operation in a bus width of the common parallel port by appending data representing an identifier of each of the processors (hereinafter, a processor identifier) to each of a series of transfer codes capable of constructing transfer target data, and
successively writing the generated writing unit in the common parallel port without performing exclusive control in the common parallel port;
by the data classification means,
successively reading the writing unit from the common parallel port, and
successively outputting, to the computing means associated with data representing the processor identifier included in the read writing unit, the series of transfer codes included in the read writing unit; and
by the computing means,
re-constructing the transfer target data, based on the series of transfer codes output by the data classification means.

In one aspect of the invention, a non-transitory storage medium stores a data transfer program of an information processing device provided with a plurality of processors and a common parallel port to be shared by the plurality of processors. The data transfer program causes a computer included in the information processing device to execute
processing of generating a writing unit writable by a one-time operation in a bus width of the common parallel port by appending data representing an identifier of each of the processors (hereinafter, a processor identifier) to each of a series of transfer codes capable of representing transfer target data, and successively writing the generated writing unit in the common parallel port without performing exclusive control in the common parallel port.

In one aspect of the invention, a non-transitory storage medium stores a data transfer program of a peripheral device provided with data classification means and a plurality of computing means. The data transfer program causes a computer included in the peripheral device to execute:

by the data classification means, processing of successively reading, from a parallel port included in an information processing device including a plurality of processors and the common parallel port to be shared by the plurality of processors, a writing unit writable by a one-time operation in a bus width of the common parallel port by appending data representing an identifier of each of the processors (hereinafter, a processor identifier) included in the information processing device to each of a series of transfer codes capable of representing transfer target data to be transferred by the information processing device, and successively outputting, to the computing means associated with data representing the processor identifier included in the read writing unit, the series of transfer codes included in the read writing unit; and by the computing means, processing of re-constructing the transfer target data, based on the series of transfer codes output by the data classification means.

Advantageous Effects of Invention

The present invention provides an advantageous effect of being able to suppress occurrence of a deadlock due to exclusive control in a common parallel port by an inexpensive configuration, in transferring data from an information processing device including a plurality of processors and the common parallel port to be shared by the plurality of processors to a peripheral device.

BRIEF DESCRIPTION OF DRAWINGS

FIG. 8 is a table describing an operation example of the information processing system in the second example embodiment of the present invention.

FIG. 9 is a table describing another operation example of the information processing system in the second example embodiment of the present invention.

EXAMPLE EMBODIMENT

In the following, example embodiments of the present invention are described in detail with reference to the drawings. In all the drawings, equivalent components are indicated with same reference numbers, and description thereof is omitted as necessary.

First Example Embodiment

A first example embodiment of the present invention being a base of each example embodiment of the present invention is described.

A configuration in the present example embodiment is described.

Figure 1:
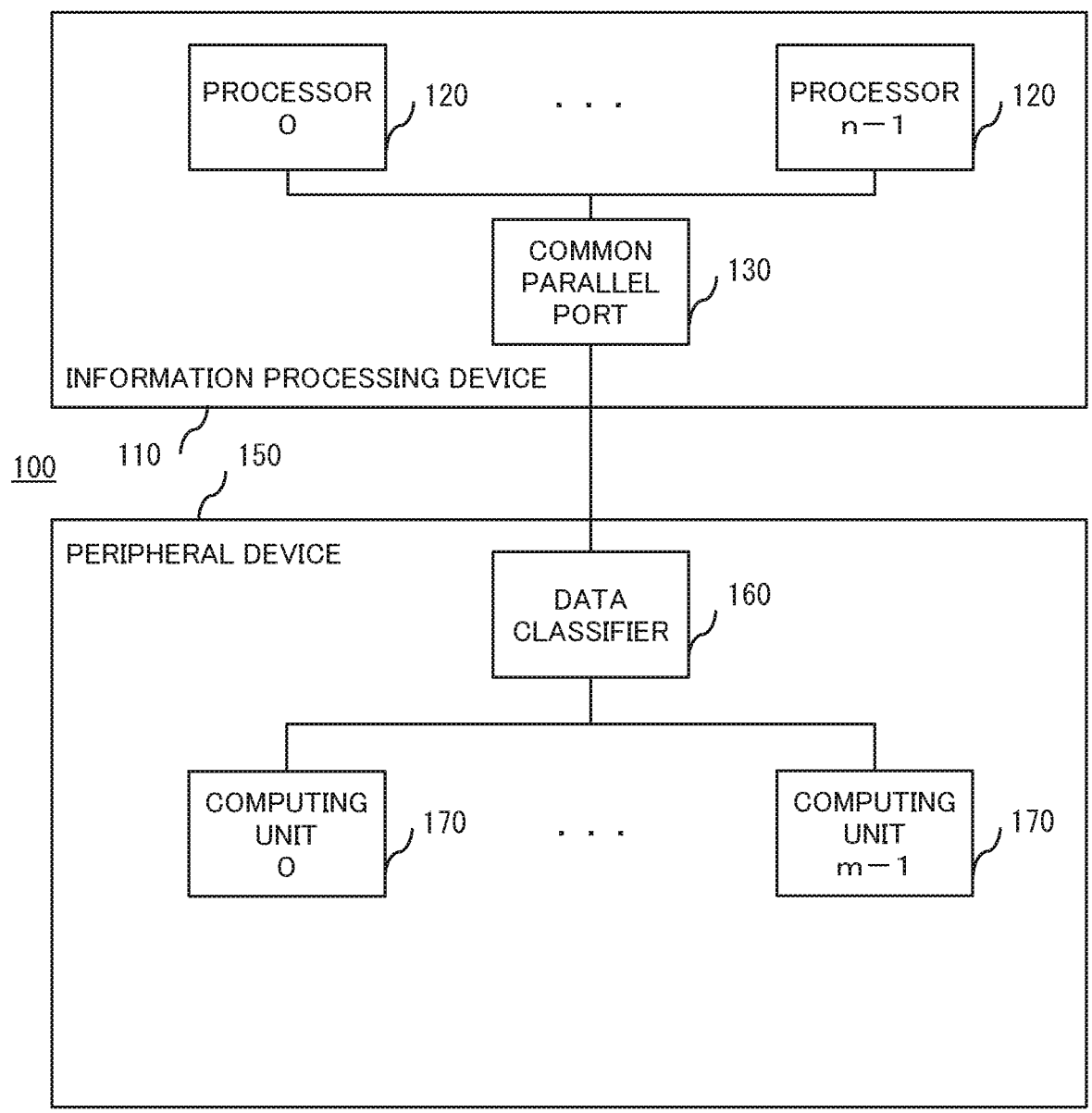
FIG. 1 is a block diagram illustrating an example of a configuration of an information processing system in a first example embodiment of the present invention.

FIG. 1 is a block diagram illustrating an example of a configuration of an information processing system in the first example embodiment of the present invention.

Information processing system 100 in the present example embodiment includes information processing device 110 and peripheral device 150.

Information processing device 110 and peripheral device 150 are connected by a parallel port cable.

Information processing device 110 includes common parallel port 130 and a plurality of processors 120.

Common parallel port 130 transmits and receives in parallel a plurality of data signals via communication lines different from each other. Common parallel port 130 is in conformity with, for example, industry standard architecture (ISA) or the institute of electrical and electronics engineers (IEEE) 1284. Common parallel port 130 is shared by processors 120.

Each processor 120 transmits, to peripheral device 150, data being a transfer target (hereinafter, referred to as "transfer target data") by using common parallel port 130. In the following, it is assumed that a number of processors 120 included in information processing device 110 is n (where n is an integer of 2 or larger). Further, k-th processor 120 (where k is an integer from 0 to n−1) is also referred to as "processor k".

Each processor 120 generates a writing unit by appending data representing a processor identifier to each of a series of transfer codes. A transfer code is a code to be transmitted and received via common parallel port 130 capable of representing transfer target data. A processor identifier is an identifier of each processor 120. It is assumed that a processor identifier is expressible by Q bits (where Q is an integer of 1 or larger). A writing unit is data writable by a one-time operation in a bus width of common parallel port 130. It is assumed that a bus width of common parallel port 130 is W bits (where W is an integer of 2 or larger).

Each transfer code included in a series of transfer codes is transmitted in a predetermined order. Each transfer code included in a series of transfer codes represents a value of a digit different from each other, when transfer target data are expressed by L-adic number (where L is an integer of 2 or larger), for example. L is equal to or smaller than a maximum integer value expressible by binary number of (W-Q) bits.

Each processor 120 successively writes a generated writing unit in common parallel port 130 without performing exclusive control in common parallel port 130. The writing unit written in common parallel port 130 by each processor 120 is transmitted to peripheral device 150.

Peripheral device 150 includes data classifier 160 and a plurality of computing units 170.

Data classifier 160 successively reads the writing unit written by processor 120 from common parallel port 130.

Data classifier 160 successively outputs, to computing unit 170 associated with data representing a processor identifier included in the read writing unit, the transfer code included in the read writing unit. It is assumed that each computing unit 170 is associated in advance with data representing a specific processor identifier. When data representing a new processor identifier is detected, data classifier 160 may dynamically associate data representing the processor identifier with a certain computing unit 170. It is assumed that data classifier 160 (such as CPU 903 in FIG. 12) stores data representing a state that a certain computing unit 170 and a certain processor 120 are associated with each other in an unillustrated memory (such as storage device 902 in FIG. 12), for example. In the following, it is assumed that a number of computing units 170 included in peripheral device 150 is m (where m is an integer of not smaller than 2 but not larger than n). k-th (where k is an integer from 0 to m−1) computing unit 170 is also referred to as "computing unit k".

Each computing unit 170 re-constructs the transfer target data, based on the series of transfer codes output by data classifier 160. It is assumed that "re-constructing" is reading, by a reception-side device, a series of transfer codes representing a certain piece of transfer target data written by a transmission-side device, and generating, by the reception-side device, the transfer target data, based on the series of read transfer codes. Each computing unit 170 calculates transfer target data, based on each transfer code representing a value of a digit different from each other, when transfer target data read in a predetermined order are expressed in terms of L-adic number, for example.

An operation in the present example embodiment is described.

Figure 2:
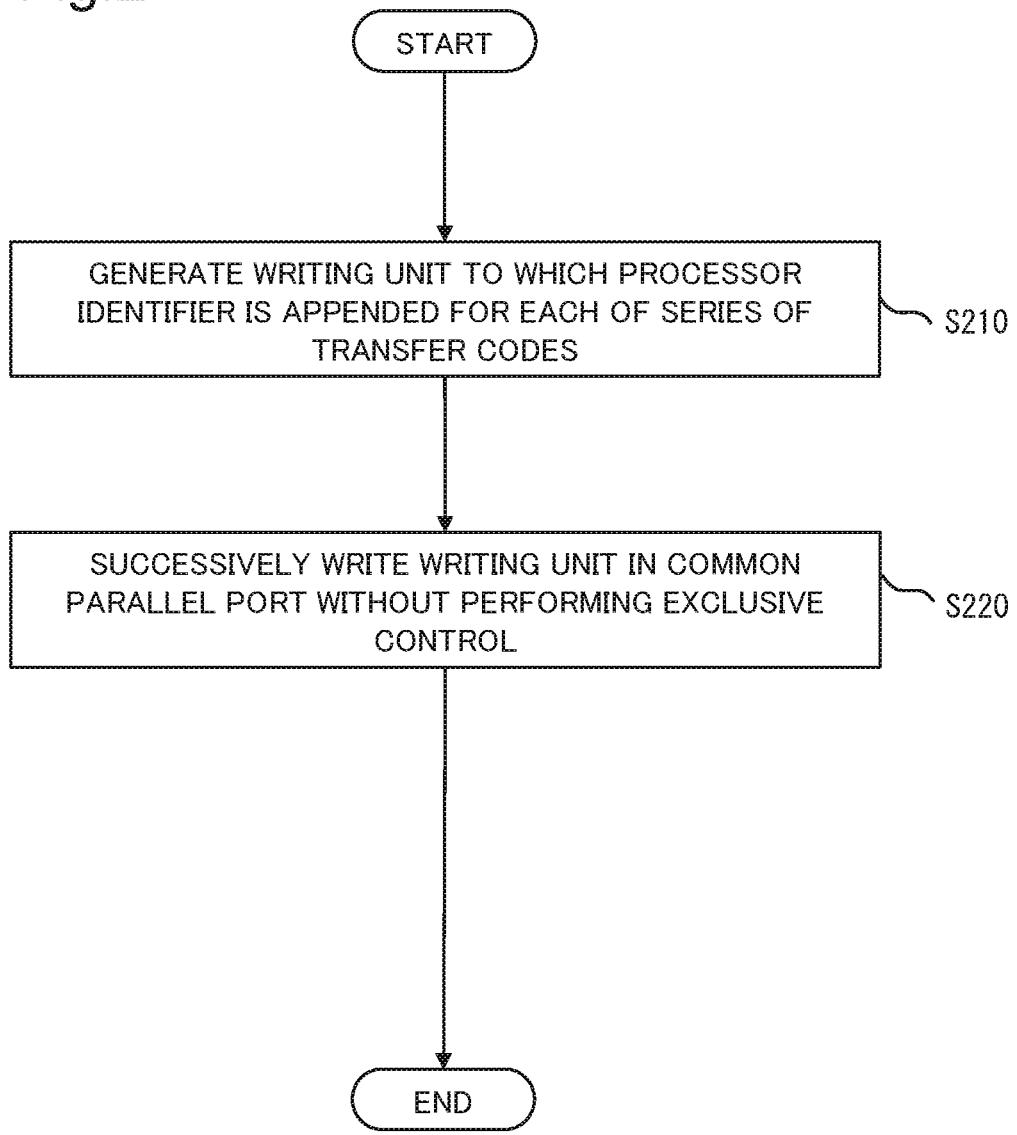
FIG. 2 is a flowchart illustrating an operation of an information processing device in the first example embodiment of the present invention.

FIG. 2 is a flowchart illustrating an operation of an information processing device in the first example embodiment of the present invention. The flowchart illustrated in FIG. 2 and the following description are an example. A processing order and the like may be interchanged, processing may be returned, or processing may be repeated according to processing required as necessary.

First, each processor 120 generates a writing unit by appending data representing a processor identifier to each of a series of transfer codes (Step S210).

Next, each processor 120 successively writes the generated writing unit in common parallel port 130 without performing exclusive control in common parallel port 130 (Step S220).

Figure 3:
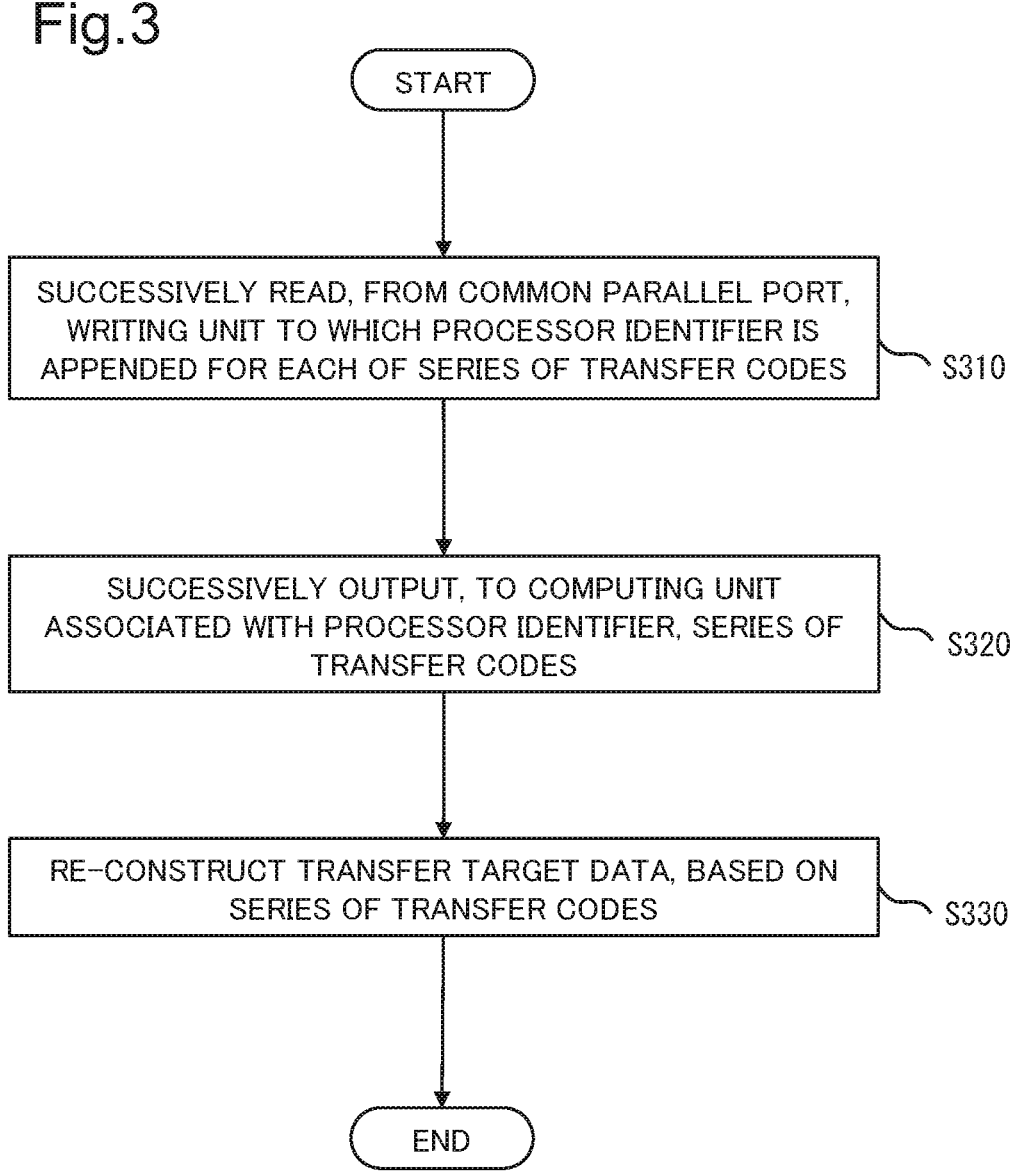
FIG. 3 is a flowchart illustrating an operation of a peripheral device in the first example embodiment of the present invention.

FIG. 3 is a flowchart illustrating an operation of a peripheral device in the first example embodiment of the present invention. The flowchart illustrated in FIG. 3 and the following description are an example. A processing order and the like may be interchanged, processing may be returned, or processing may be repeated according to processing required as necessary.

First, data classifier 160 successively reads the writing unit written by processor 120 from common parallel port 130 (Step S310).

Next, data classifier 160 successively outputs, to computing unit 170 associated with data representing the processor identifier included in the read writing unit, the series of transfer codes included in the read writing unit (Step S320).

Subsequently, each computing unit 170 re-constructs the transfer target data, based on the series of transfer codes output by data classifier 160 (Step S330).

A specific example of an operation in the present example embodiment is described.

Figure 4:
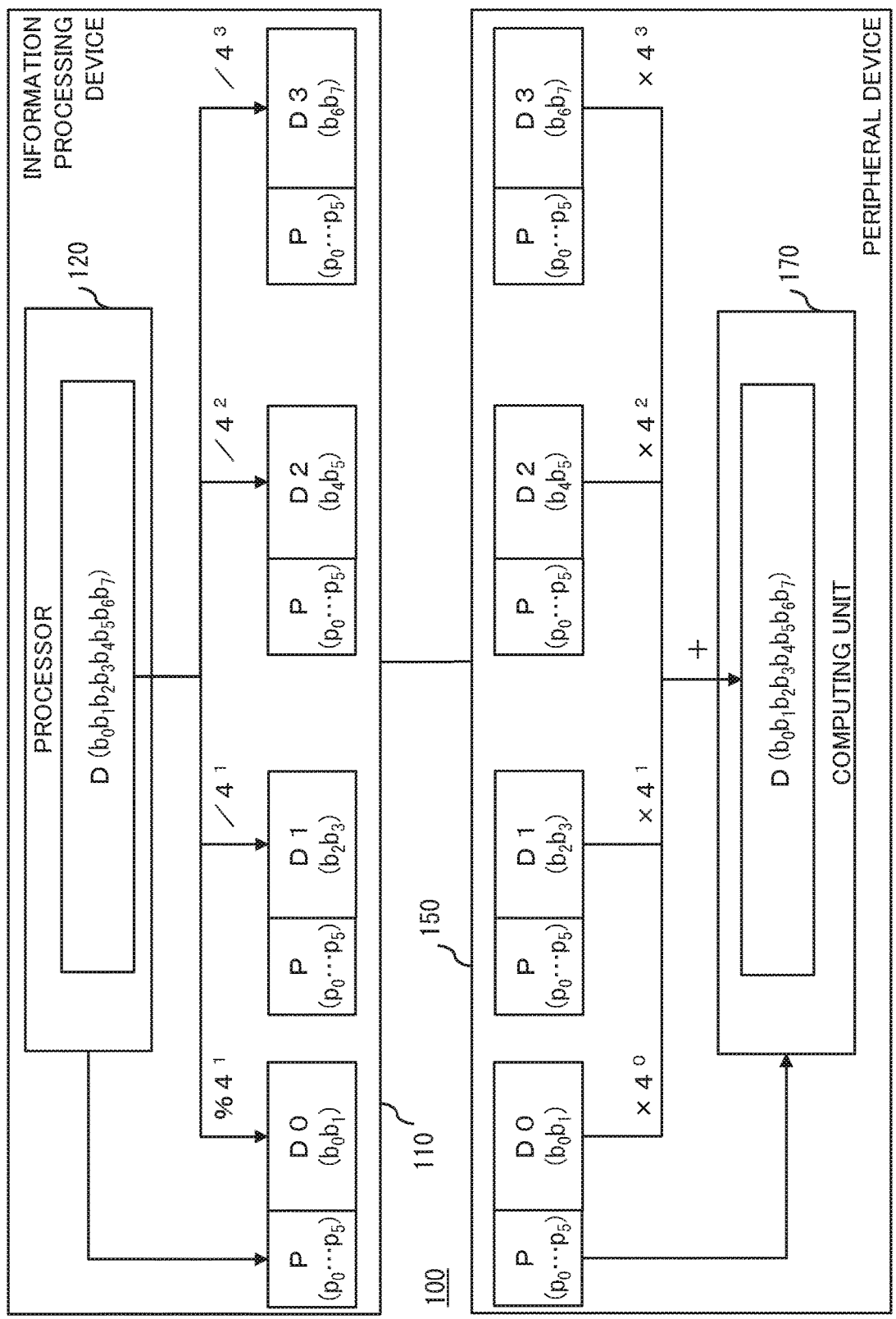
FIG. 4 is a schematic diagram describing an operation example of the information processing system in the first example embodiment of the present invention.

FIG. 4 is a schematic diagram describing an operation example of an information processing system in the first example embodiment of the present invention. In FIG. 4, it is assumed that a content inside brackets is an expression in terms of bits. It is assumed that a symbol "%" indicates a residue, a symbol "/" indicates division, and a symbol "x" indicates multiplication (same definition is also applied to FIG. 5). It is assumed that transfer target data are 8-bit data ($D=b_0b_1b_2b_3b_4b_5b_6b_7$). It is assumed that a bus width (W) of common parallel port 130 is 8 bits. It is assumed that a processor identifier is expressed by 6-bit data ($P=p_0p_1p_2p_3p_4p_5$). It is assumed that each transfer code included in a series of transfer codes represents a value of a digit different from each other, when transfer target data are expressed by quaternary number (maximum integer value expressible by binary number of L=(W-Q) bits=4).

First, each processor 120 generates a writing unit by appending data representing a processor identifier P ($p_0p_1p_2p_3p_4p_5$) to each of a series of transfer codes $D0(b_0b_1)$, $D1(b_2b_3)$, $D2(b_4b_5)$, and $D3(b_6b_7)$ (Step S210). The transfer code D0 is a residue acquired by dividing transfer target data D by $4^1$. The transfer code D1 is a quotient acquired by dividing the transfer target data D by $4^1$. The transfer code D2 is a quotient acquired by dividing the transfer target data D by $4^2$. The transfer code D3 is a quotient acquired by dividing the transfer target data D by $4^3$. Processor 120 may perform division by shift calculation.

Next, each processor 120 successively writes the generated writing unit in common parallel port 130 without performing exclusive control in common parallel port 130 (Step S220).

Subsequently, data classifier 160 successively reads the writing unit written by processor 120 from common parallel port 130 (Step S310).

Subsequently, data classifier 160 successively outputs, to computing unit 170 associated with data representing the processor identifier P ($p_0p_1p_2p_3p_4p_5$) included in the read writing unit, the series of transfer codes $D0(b_0b_1)$, $D1(b_2b_3)$, $D2(b_4b_5)$, and $D3(b_6b_7)$ included in the read writing unit (Step S320).

Subsequently, each computing unit 170 re-constructs the transfer target data, based on the series of transfer codes output by data classifier 160 (Step S330). The transfer target data D are re-constructed by calculating: $D0 \times 4^0 + D1 \times 4^1 + D2 \times 4^2 + D3 \times 4^3$. Addition may be performed by shift calculation.

Another specific example of an operation in the present example embodiment is described.

Figure 5:
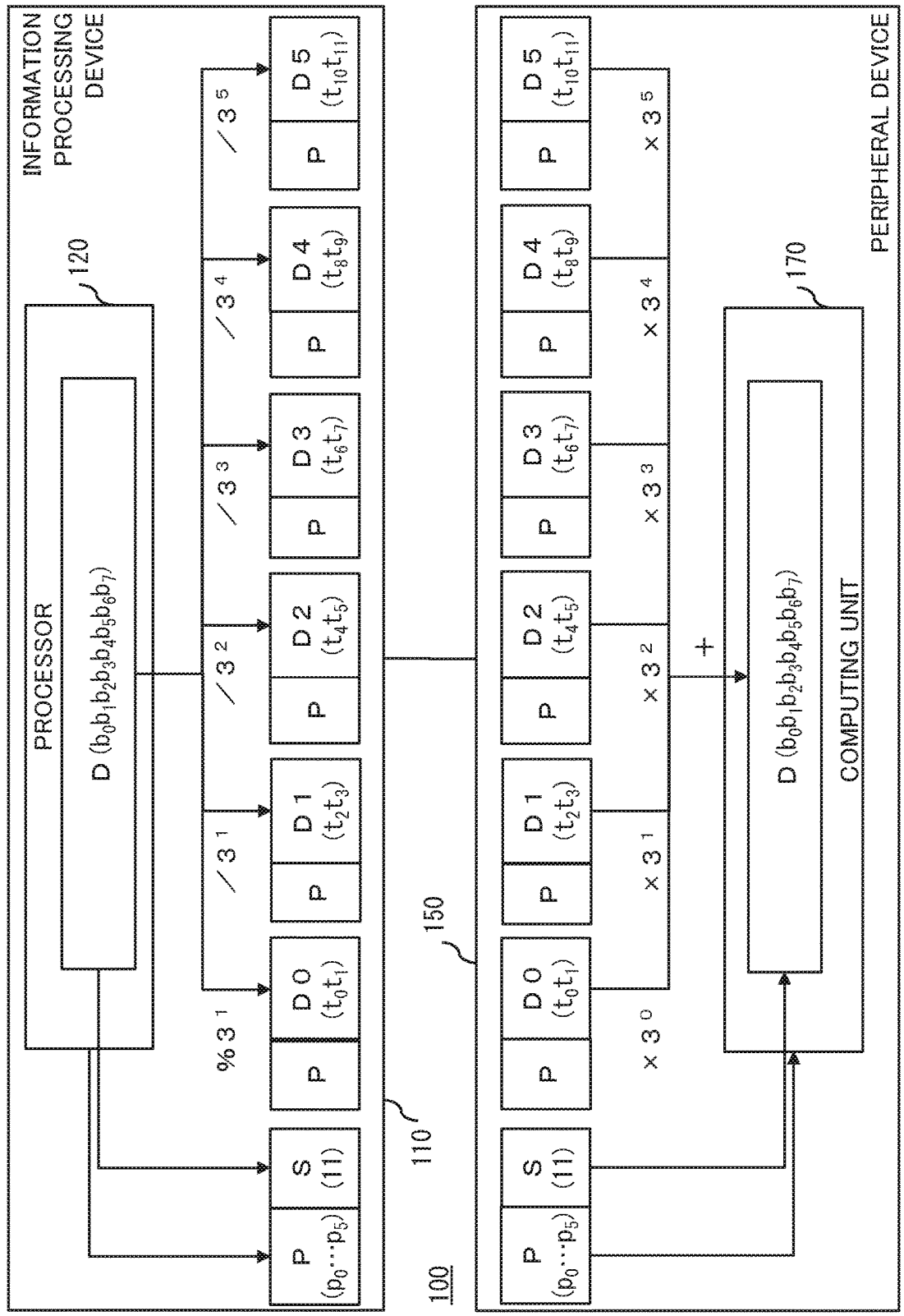
FIG. 5 is a schematic diagram describing another operation example of the information processing system in the first example embodiment of the present invention.

FIG. 5 is a schematic diagram describing another operation example of the information processing system in the first example embodiment of the present invention. In FIG. 5, it is assumed that a content inside brackets is an expression in terms of bits. It is assumed that transfer target data are 8-bit data ($D=b_0b_1b_2b_3b_4b_5b_6b_7$). It is assumed that a bus width (W) of common parallel port 130 is 8 bits. It is assumed that a processor identifier is expressed by 6-bit data $(P=p_0p_1p_2p_3p_4p_5)$ (Q=6). It is assumed that each transfer code included in a series of transfer codes represents a value of a digit different from each other, when transfer target data are expressed by ternary number (maximum integer value expressible by binary number of L=(W-Q) bits-1=3).

First, each processor 120 generates a writing unit by appending data representing a processor identifier P $(p_0p_1p_2p_3p_4p_5)$ to each of a series of transfer codes $D0(t_0t_1)$, $D1(t_2t_3)$, $D2(t_4t_5)$, $D3(t_6t_7)$, $D4(t_8t_9)$, and $D5(t_{10}t_{11})$ (Step S210). The transfer code D0 is a residue acquired by dividing transfer target data D by $3^1$. The transfer code D1 is a quotient acquired by dividing the transfer target data D by $3^1$. The transfer code D2 is a quotient acquired by dividing the transfer target data D by $3^2$. The transfer code D3 is a quotient acquired by dividing the transfer target data D by $3^3$. The transfer code D4 is a quotient acquired by dividing the transfer target data D by $3^4$. The Transfer code D5 is a quotient acquired by dividing the transfer target data D by $3^5$. Each processor 120 appends a start code S(11) to a leading position of the series of transfer codes. The start code S(11) is a transfer code indicating start of transferring a certain piece of transfer target data D among pieces of transfer target data. Since a transfer code includes the start code S(11), a value expressible by one transfer code is not smaller than 0 but not larger than 2.

Next, each processor 120 successively writes the generated writing unit in common parallel port 130 without performing exclusive control in common parallel port 130 (Step S220).

Subsequently, data classifier 160 successively reads the writing unit written by processor 120 from common parallel port 130 (Step S310).

Subsequently, data classifier 160 successively outputs, to computing unit 170 associated with data representing the processor identifier P $(p_0p_1p_2p_3p_4p_5)$ included in the read writing unit, the series of transfer codes $D0(t_0t_1)$, $D1(t_2t_3)$, $D2(t_4t_5)$, $D3(t_6t_7)$, $D4(t_8t_9)$, and $D5(t_{10}t_{11})$ included in the read writing unit (Step S320).

Subsequently, each computing unit 170 re-constructs the transfer target data, based on the series of transfer codes output by data classifier 160 (Step S330). The transfer target data D are re-constructed by calculating: $D0\times3^0+D1\times3^1+D2\times3^2+D3\times3^3+D4\times3^4+D5\times3^5$. The start code S(11) is not used in calculation of the transfer target data D, but is used as a trigger of initializing data held in each computing unit 170.

As described above, in information processing system 100 of the present example embodiment, each processor 120 of information processing device 110 appends data representing an identification number of processor 120 to each transfer code in a series of transfer codes representing transfer target data, and writes the transfer code in common parallel port 130. Data classifier 160 in peripheral device 150 outputs, to computing unit 170 associated with each processor 120, the series of transfer codes read from common parallel port 130, based on a processor identifier read from common parallel port 130. Computing unit 170 of peripheral device 150 re-constructs the transfer target data for each processor 120. In information processing system 100, a special component such as an interruption request register to be shared among processors 120 is not necessary. Therefore, information processing system 100 in the present example embodiment provides an advantageous effect of being able to suppress occurrence of a deadlock due to exclusive control in common parallel port 130 by an inexpensive configuration, in data transfer from information processing device 110 including a plurality of processors 120 and common parallel port 130 to be shared by the plurality of processors 120 to peripheral device 150.

Second Example Embodiment

Next, a second example embodiment of the present invention on the basis of the first example embodiment of the present invention is described. In an information processing system in the present example embodiment, transfer target data output by each processor of an information processing device is displayed by a peripheral device. In the information processing system in the present example embodiment, an interruption is allowed when data are transferred by each processor. In the present application, it is assumed that an "interruption" means that a certain processor 120 starts transferring second data during transfer of first data in common parallel port 130, and continues to transfer the first data after transfer of the second data is finished. Likewise, multiple "interruptions" are also defined. For example, an "interruption" of transferring third data may be performed during transfer of second data. It is assumed that whether a certain processor performs an interruption regarding some pieces of data at a certain point of time is referred to a "nest level of interruption" or simply a "nest level".

A configuration in the present example embodiment is described.

Figure 6:
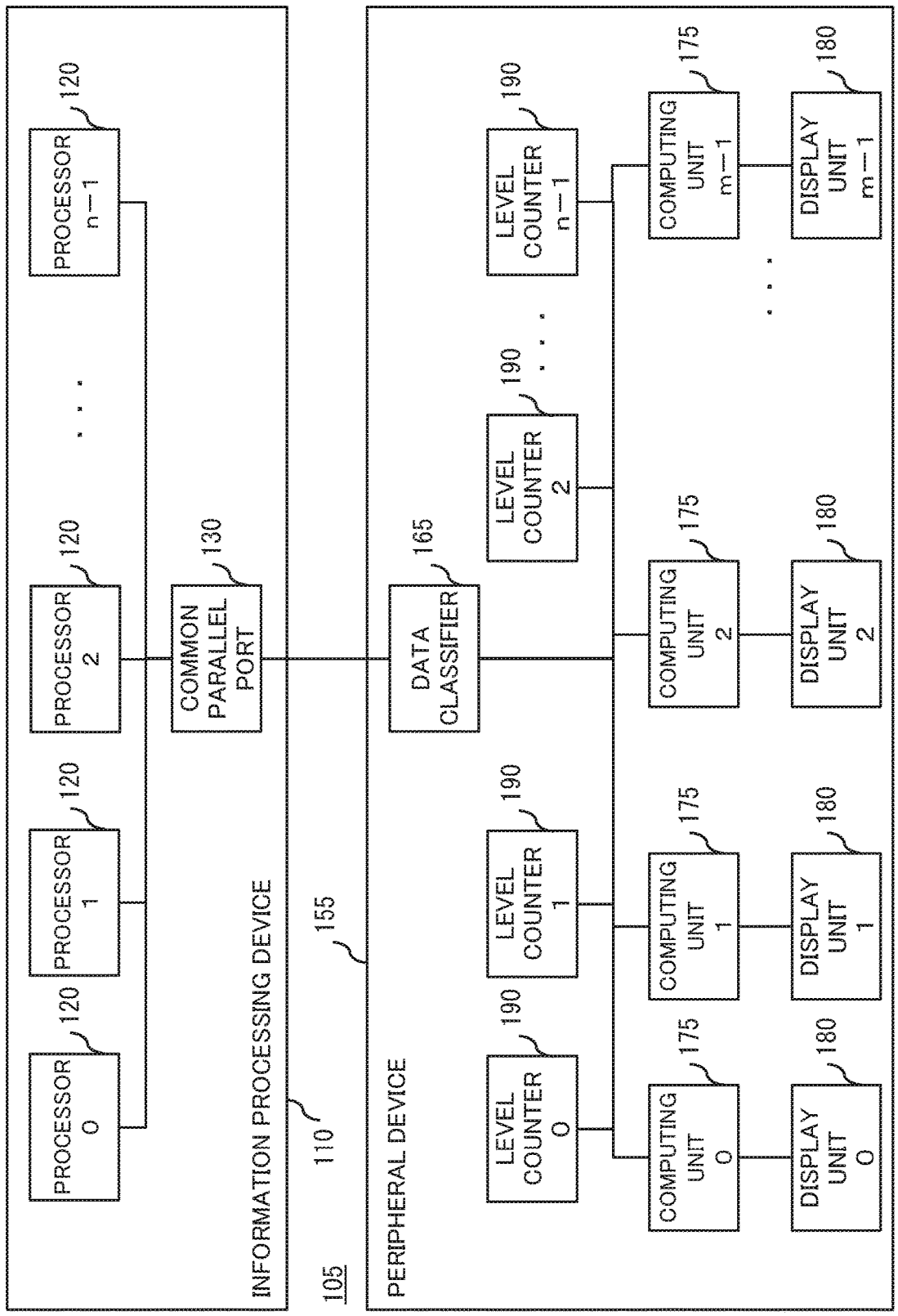
FIG. 6 is a block diagram illustrating an example of a configuration of an information processing system in a second example embodiment of the present invention.

FIG. 6 is a block diagram illustrating an example of a configuration of an information processing system in the second example embodiment of the present invention.

Information processing system 105 in the present example embodiment includes information processing device 110 and peripheral device 155. Information processing device 110 and peripheral device 155 are connected by a parallel port cable.

Information processing device 110 includes common parallel port 130 and a plurality of processors 120. Transfer target data are, for example, a POST code to be output by a BIOS of each processor 120. Processor 120 may perform an interruption of data transfer. Processor 120 writes a start code before writing, in common parallel port 130, a transfer code representing a certain piece of transfer target data. Processor 120 writes a new start code during transfer of original data, when an interruption is performed in transferring data, and continues to transfer original data after transfer of new data is completed.

Peripheral device 155 includes data classifier 165, a plurality of computing units 175, a plurality of display units 180, and a plurality of level counters 190.

Level counter 190 holds a nest level in data transfer by processor 120 associated with the level counter 190. Each level counter 190 is associated with each processor 120. In other words, a number of level counters 190 is equal to or larger than a number n of processors 120. It is assumed that data classifier 165 (such as CPU 903 in FIG. 12) stores data representing a state that a certain level counter 190 and a certain processor 120 are associated with each other in an unillustrated memory (such as storage device 902 in FIG. 12), for example.

Data classifier 165 successively reads a writing unit written in common parallel port 130 by information processing device 110. Data classifier 165 successively outputs, to computing unit 175 associated with a set constituted by data representing a processor identifier included in a read writing unit, and a value of a nest level of processor 120 indicated by the processor identifier, a transfer code included in a read writing unit. It is assumed that data classifier 165

(such as CPU 903 in FIG. 12) stores data representing a state that a certain computing unit 175, and a certain set constituted by a processor identifier and a value of a nest level are associated with each other in an unillustrated memory (such as storage device 902 in FIG. 12), for example.

Each computing unit 175 re-constructs the transfer target data, based on a series of transfer codes output by data classifier 165. It is assumed that each computing unit 175 is associated with a set constituted by each processor 120, and a certain value of a nest level of the processor 120. Each computing unit 175 may be associated in advance with a set constituted by a certain processor 120, and a certain value of a nest level of the processor 120, for example. When a new set constituted by data representing a processor identifier, and a certain value of a nest level relating to the processor identifier is detected, data classifier 165 may dynamically associate data identifying the set with a certain computing unit 175. In other words, a number of computing units 175 is equal to or larger than a number acquired by multiplying a number n of processors 120 by a number of a possible value of a nest level.

Display unit 180 displays transfer target data re-constructed by computing unit 175. Display unit 180 displays a POST code output by a BIOS of each processor 120, for example. It is assumed that each display unit 180 is associated with each computing unit 175. In other words, a number of display units 180 is equal to or larger than a number of computing units 175.

Another configuration in the present example embodiment is the same as the configuration in the first example embodiment.

Figure 7:
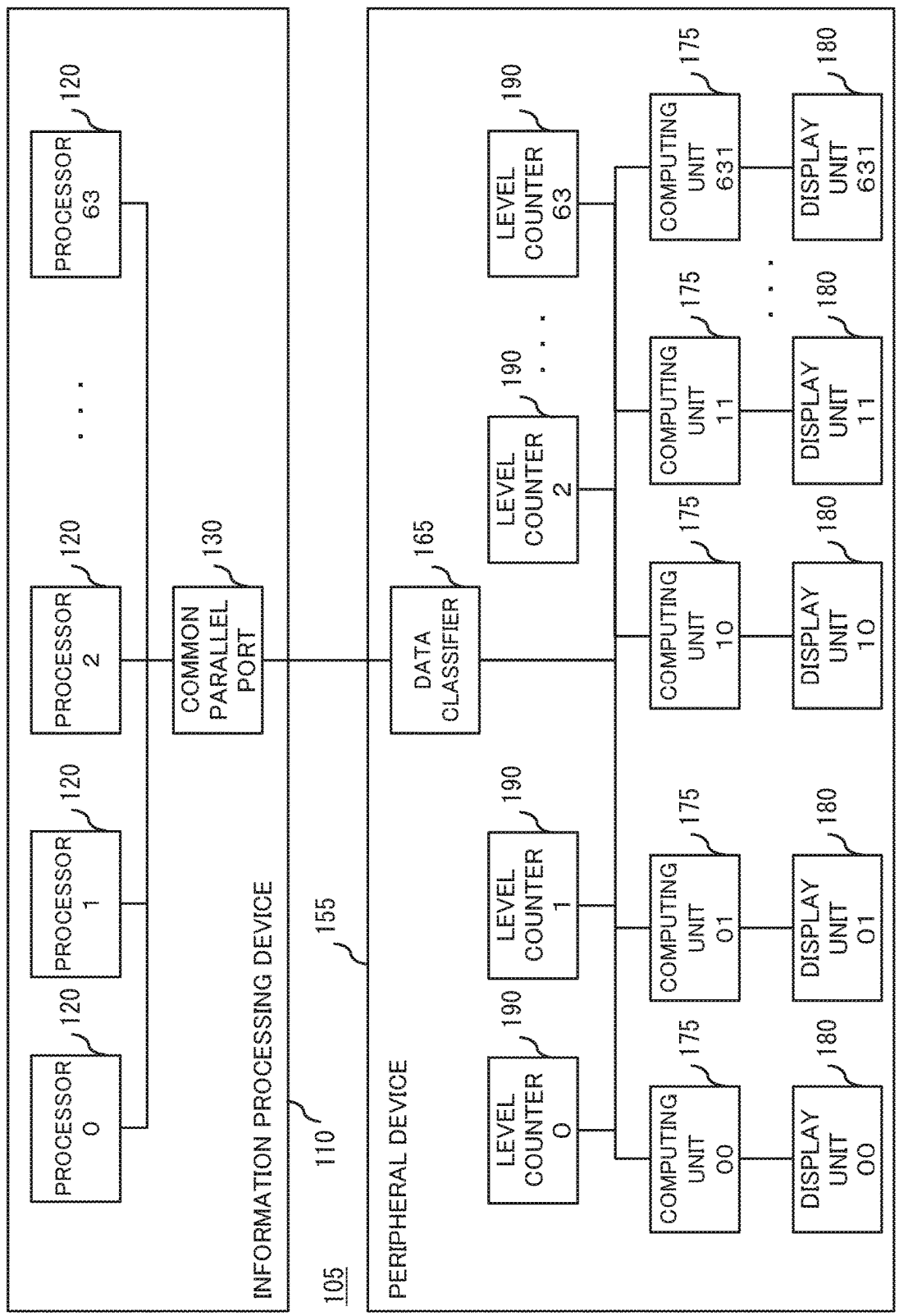
FIG. 7 is a block diagram illustrating an implementation example of the information processing system in the second example embodiment of the present invention.

FIG. 7 is a block diagram illustrating an implementation example of an information processing system in the second example embodiment of the present invention. In FIG. 7, to simplify explanation, it is assumed that a number of a possible value of a nest level is 2. It is assumed that numbers n of processors 120 and level counters 190 are each 64. It is assumed that numbers m of computing units 175 and display units 180 are each 128. It is assumed that level counters "0", "1", . . . , and "63" are associated in advance with processors "0", "1", . . . , and "63" in order. It is assumed that computing units "00", "10", . . . , and "630" are associated in advance with sets constituted by processors "0", "1", . . . , and "63", and nest level "1" in order. It is assumed that computing units "01", "11", . . . , and "631" are associated in advance with sets constituted by processors "0", "1", . . . , and "63", and nest level "2" in order. It is assumed that display units "00", "10", . . . , and "630" are associated in advance with computing units "00", "10", . . . , and "630" in order. It is assumed that display units "01", "11", . . . , and "631" are associated in advance with computing units "01", " 11", . . . , and "631" in order.

An operation in the present example embodiment is described. An operation in an implementation example of the information processing system illustrated in FIG. 7 is described.

Operation Example 1

First, an operation when an interruption does not occur is described.

FIG. 8 is a table describing an operation example of the information processing system in the second example embodiment of the present invention. More specifically, FIG. 8 illustrates an operation example of peripheral device 155 in information processing system 105. In FIG. 8, a "timing" column indicates a timing in an operation. A "reception signal" column indicates a set constituted by data representing a processor identifier received by data classifier 165, and a transfer code. "P0" indicates an identifier of processor "0", and "P1" indicates an identifier of the processor "1". "S" indicates a start code. "D00", "D01", . . . , and "D05" indicate a series of transfer codes representing transfer target data (transfer target data "D0") of the processor "0". "D10", "D11", . . . , and "D15" indicate a series of transfer codes representing transfer target data (transfer target data "D1") of the processor "1". A "counter 0" column indicates a value represented by data to be held by the level counter "0". A "counter 1" column indicates a value represented by data to be held by the level counter "1". A "computing unit 00" column indicates a value represented by data to be held by the computing unit "00". A "computing unit 10" column indicates a value represented by data to be held by the computing unit "10".

Peripheral device 155 is operated as follows.

Timing 1:

Data classifier 165 reads "P0" and "S", increments the level counter "0" by 1, and initializes the computing unit "00" (in FIG. 8, expressed by "-", and hereinafter, same definition is applied). Since the other computing unit, which is not mentioned, holds a previous state including the following timings, individual description regarding the other computing unit is omitted.

Timing 2:

Data classifier 165 reads "P1" and "S", increments the level counter "1" by 1, and initializes the computing unit "10".

Timing 3:

Data classifier 165 reads "P1" and "D10", and outputs to the computing unit "10". In response to the output, the computing unit "10" holds the input value "D10".

Timing 4:

Data classifier 165 reads "P0" and "D00", and outputs to the computing unit "00". In response to the output, the computing unit "00" holds the input value "D00".

Timing 5:

Data classifier 165 reads "P1" and "D11", and outputs to the computing unit "10". In response to the output, the computing unit "10" adds a value acquired by multiplying the input value "D11" by 3 to the held value "D10".

Timing 6:

Data classifier 165 reads "P0" and "D01", and outputs to the computing unit "00". In response to the output, the computing unit "00" adds a value acquired by multiplying the input value "D01" by 3 to the held value "D00".

Timing 7:

Data classifier 165 reads "P0" and "D02", and outputs to the computing unit "00". In response to the output, the computing unit "00" adds a value acquired by multiplying the input value "D02" by $3^2$ to the held value "D00+D01×3".

Timing 8:

Data classifier 165 reads "P1" and "D12", and outputs to the computing unit "10". In response to the output, the computing unit "10" adds a value acquired by multiplying the input value "D12" by $3^2$ to the held value "D10+D11×3".

. . . (partially omitted) . . .

Timing 13:

Data classifier 165 reads "P0" and "D05", and outputs to the computing unit "00". In response to the output, the computing unit "00" adds a value acquired by multiplying the input value "D05" by $3^5$ to the held value "D00+D01× 3+D02×$3^2$+D03×$3^3$+D04×$3^4$". Subsequently, the computing unit "00" decrements the level counter "0" by 1. In the present example, by the above-described operation, the computing unit "00" completes re-construction of transfer target data "D0".

Timing 14:

Data classifier 165 reads "P1" and "D15", and outputs to the computing unit "10". In response to the output, the computing unit "10" adds a value acquired by multiplying the input value "D15" by $3^5$ to the held value "D10+D11×3+D12×$3^2$+D13×$3^3$+D14×$3^4$". Subsequently, the computing unit "10" decrements the level counter "1" by 1. In the present example, by the above-described operation, the computing unit "10" completes re-construction of transfer target data "D1".

Operation Example 2

Next, an operation when an interruption occurs is described.

FIG. 9 is a table describing another operation example of the information processing system in the second example embodiment of the present invention. More specifically, FIG. 9 illustrates an operation example of peripheral device 155 in information processing system 105. A description method in FIG. 9 is the same as the description method in FIG. 8. "D00", "D01", . . . , and "D05" indicate a series of transfer codes representing transfer target data (transfer target data "D0") of the processor "0". "D10", "D11", . . . , and "D15" indicate a series of transfer codes representing another piece of transfer target data (transfer target data "D1") of the processor "0". A "computing unit 01" column indicates a value represented by data to be held by the computing unit "01".

Peripheral device 155 is operated as follows.

Timing 1:

Data classifier 165 reads "P0" and "S", increments the level counter "0" by 1, and initializes the computing unit "00" (in FIG. 9, expressed by "-", and hereinafter, same definition is applied). Since the other computing unit, which is not referred to, holds a previous state including the following timings, individual description regarding the other computing unit is omitted.

Timing 2:

Data classifier 165 reads "P0" and "D00", and outputs to the computing unit "00". In response to the output, the computing unit "00" holds the input value "D00".

Timing 3:

Data classifier 165 reads "P0" and "D01", and outputs to the computing unit "00". In response to the output, the computing unit "00" adds a value acquired by multiplying the input value "D01" by 3 to the held value "D00".

Timing 4:

Data classifier 165 reads "P0" and "D02", and outputs to the computing unit "00". In response to the output, the computing unit "00" adds a value acquired by multiplying the input value "D02" by $3^2$ to the held value "D00+D01×3".

Timing 5:

Data classifier 165 reads "P0" and "S", increments the level counter "0" by 1, and initializes the computing unit "01".

Timing 6:

Data classifier 165 reads "P0" and "D10", and outputs to the computing unit "01". In response to the output, the computing unit "01" holds the input value "D10".

Timing 7:

Data classifier 165 reads "P0" and "D11", and outputs to the computing unit "01". In response to the output, the computing unit "01" adds a value acquired by multiplying the input value "D11" by 3 to the held value "D10".

Timing 8:

Data classifier 165 reads "P0" and "D12", and outputs to the computing unit "01". In response to the output, the computing unit "01" adds a value acquired by multiplying the input value "D12" by $3^2$ to the held value "D10+D11×3".

. . . (partially omitted) . . .

Timing 11:

Data classifier 165 reads "P0" and "D15", and outputs to the computing unit "01". In response to the output, the computing unit "01" adds a value acquired by multiplying the input value "D15" by $3^5$ to the held value "D10+D11×3+D12×$3^2$+D13×$3^3$+D14×$3^4$". Subsequently, the computing unit "01" decrements the level counter "0" by 1. In the present example, by the above-described operation, the computing unit "01" completes re-construction of transfer target data "D1"

. . . (partially omitted) . . .

Timing 14:

Data classifier 165 reads "P0" and "D05", and outputs to the computing unit "00". In response to the output, the computing unit "00" adds a value acquired by multiplying the input value "D05" by $3^5$ to the held value "D00+D01×3+D02×$3^2$+D03×$3^3$+D04×$3^4$". Subsequently, the computing unit "00" decrements the level counter "0" by 1. In the present example, by the above-described operation, the computing unit "00" completes re-construction of transfer target data "D0".

Other operations in the present example embodiment are the same as those in the first example embodiment.

As described above, information processing system 105 in the present example embodiment includes the components of information processing system 100 in the first example embodiment. Therefore, information processing system 105 in the present example embodiment has a same advantageous effect as information processing system 100 in the first example embodiment.

Information processing system 105 of the present example embodiment includes level counters 190 in addition to the components of information processing system 100 in the first example embodiment. In information processing system 105 in the present example embodiment, since peripheral device 155 includes level counters 190, an interruption of transferring data is enabled. Therefore, information processing system 105 of the present example embodiment has an advantageous effect that an interruption of transferring data is enabled, in addition to the advantageous effect in information processing system 100 of the first example embodiment.

Information processing system 105 of the present example embodiment includes display units 180 in addition to the components of information processing system 100 of the first example embodiment. In information processing system 105 of the present example embodiment, since peripheral device 155 includes display units 180, display of transfer target data is enabled. Therefore, information processing system 105 of the present example embodiment has an advantageous effect that display of transfer target data is enabled, in addition to the advantageous effect in information processing system 100 of the first example embodiment.

Third Example Embodiment

Next, a third example embodiment of the present invention on the basis of the first example embodiment of the present invention is described. In an information processing system in the present example embodiment, transfer target data output by each processor of an information processing device are relayed to an external controlled device connected to a peripheral device.

A configuration in the present example embodiment is described.

Figure 10:
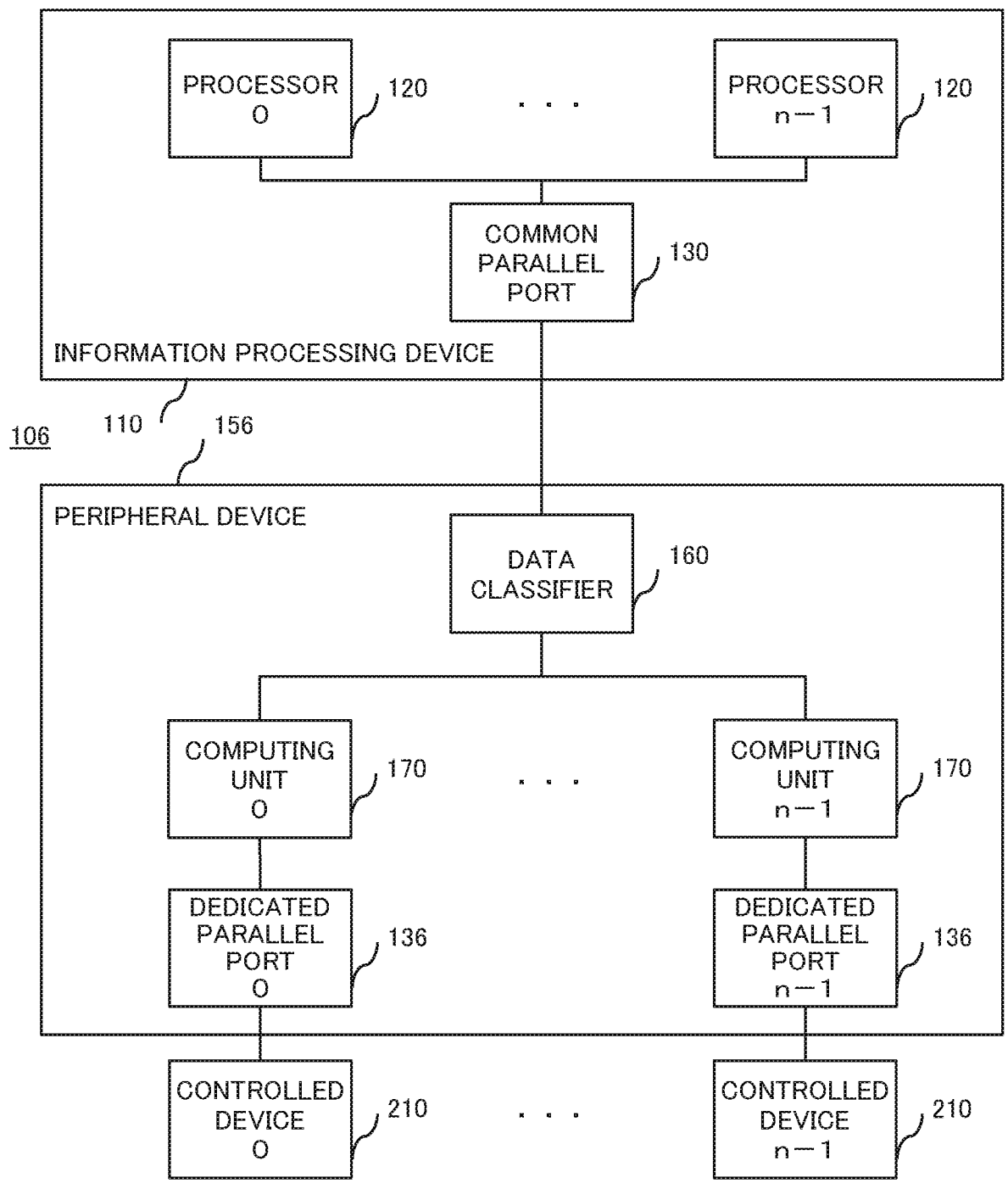
FIG. 10 is a block diagram illustrating an example of a configuration of an information processing system in a third example embodiment of the present invention.

FIG. 10 is a block diagram illustrating an example of a configuration of an information processing system in the third example embodiment of the present invention.

Information processing system 106 in the present example embodiment includes information processing device 110, peripheral device 156, and a plurality of controlled devices 210. Information processing device 110 and peripheral device 156 are connected by a parallel port cable. Peripheral device 156 and each controlled device 210 are connected by respective individual parallel port cables.

Peripheral device 156 includes data classifier 160, a plurality of Computing units 170, and a plurality of dedicated parallel ports 136.

Dedicated parallel port 136 outputs transfer target data re-constructed by computing unit 170. Dedicated parallel port 136 outputs a control instruction with respect to controlled device 210, which is output by each processor 120, for example. It is assumed that each dedicated parallel port 136 is associated with each computing unit 170. In other words, a number of dedicated parallel ports 136 is equal to or larger than a number of computing units 170.

Controlled device 210 is operated, based on transfer target data output by peripheral device 156. Controlled device 210 is, for example, a machine tool, which is operated based on an instruction received from dedicated parallel port 136.

Another configuration in the present example embodiment is the same as the configuration in the first example embodiment.

An operation in the present example embodiment is described.

Figure 11:
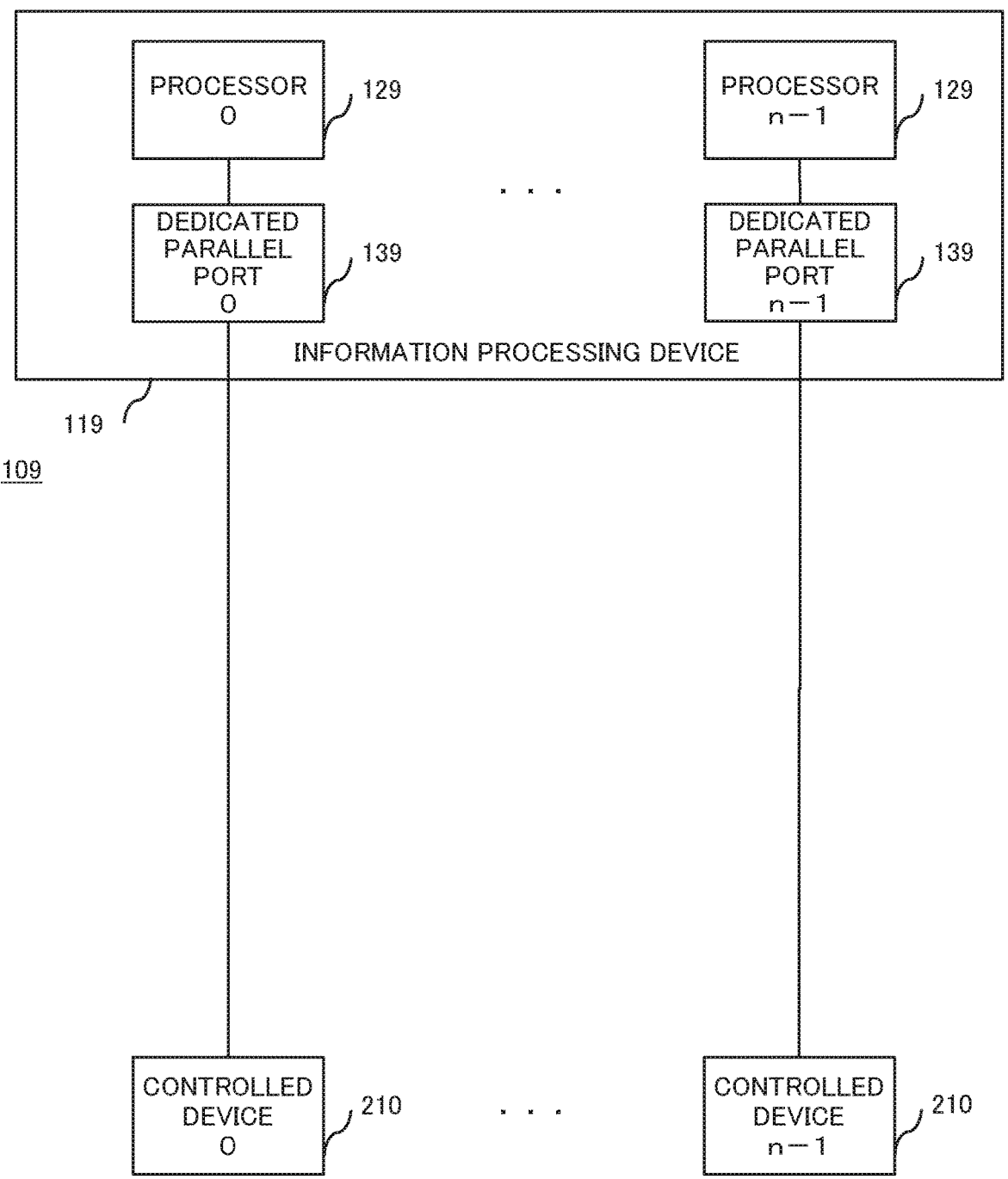
FIG. 11 is a block diagram illustrating an example of a target configuration to which the information processing system in the third example embodiment of the present invention is applied.

FIG. 11 is a block diagram illustrating an example of a target configuration to which an information processing system in the third example embodiment of the present invention is applied.

Information processing system 109 being an application target of the present example embodiment includes information processing device 119 and a plurality of controlled devices 210.

Information processing device 119 includes a plurality of processors 129 and a plurality of dedicated parallel port 139. Processors 129 do not need to be able to communicate data to one another. Each dedicated parallel port 139 is occupied by one processor 129, which is associated in advance with the dedicated parallel port 139.

Controlled device 210 is operated, based on transfer target data output by information processing device 119. Controlled device 210 is, for example, a machine tool, which is operated based on an instruction received from dedicated parallel port 139. It is assumed that dedicated parallel port 139 has an interface having compatibility with dedicated parallel port 136. For example, dedicated parallel port 139 and dedicated parallel port 136 have a same bus width, and are in conformity with a same standard.

A case is described in which a program running on each processor 129 of information processing device 119 is ported to Information processing device 110 in the present example embodiment. It is assumed that information processing device 110 does not include a dedicated parallel port for each processor 120.

A program (program to be ported) running on each processor 129 of information processing device 119 operates controlled device 210, based on transfer target data written in dedicated parallel port 139. On the other hand, a program (ported program), which runs on each processor 120 of information processing device 110, operates controlled device 210, based on transfer target data written in common parallel port 130. A difference between a program to be ported and a ported program is only a difference whether a parallel port for writing transfer target data is dedicated parallel port 139 or common parallel port 130. Since exclusive control in common parallel port 130 is not necessary, porting from a program to be ported to a ported program is easy.

Peripheral device 156 transfers data read from common parallel port 130 to controlled device 210 different for each processor 120. An interface of dedicated parallel port 136 in information processing system 106 with respect to controlled device 210 has compatibility with dedicated parallel port 139 in information processing system 109.

As described above, in information processing system 106 of the present example embodiment, it is easy to port a program running on information processing system 109. Peripheral device 156 provides controlled device 210 with an interface having compatibility with an interface in information processing system 109. Therefore, information processing system 106 of the present example embodiment provides an advantageous effect of being able to suppress a cost required for porting a program running on information processing system 109.

Figure 12:
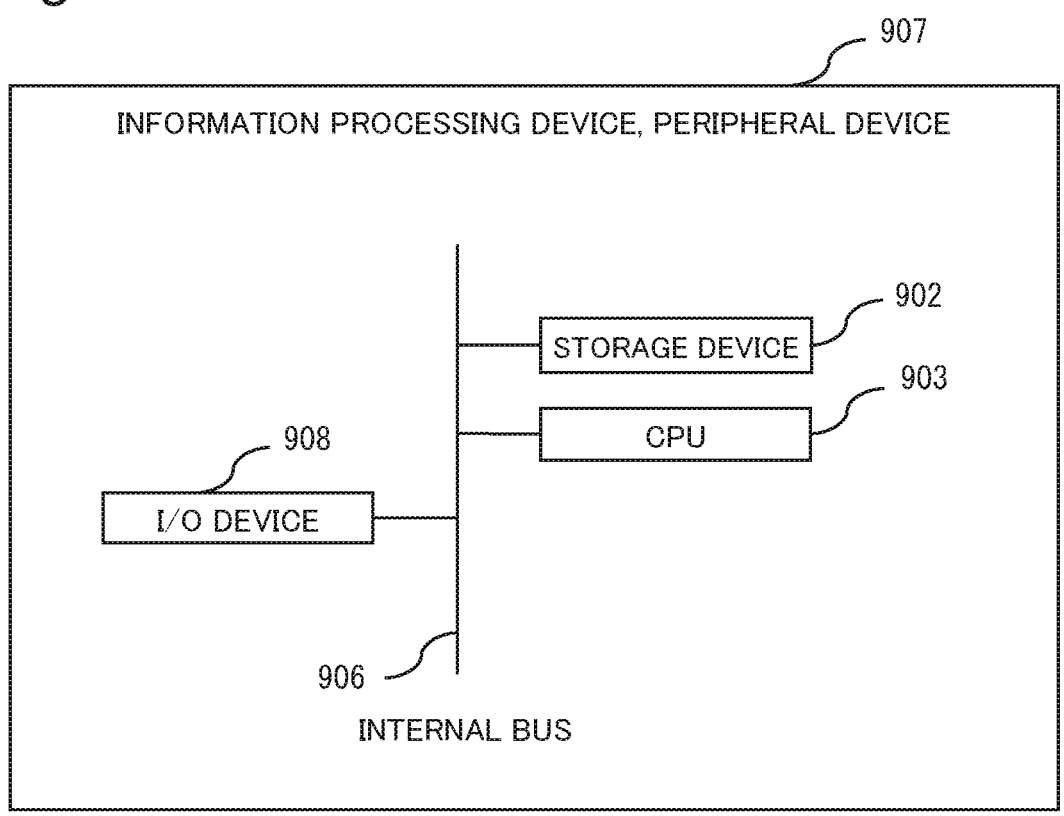
FIG. 12 is a block diagram illustrating an example of a hardware configuration capable of implementing an information processing device or a peripheral device in each of the example embodiments of the present invention.

FIG. 12 is a block diagram illustrating an example of a hardware configuration capable of implementing an information processing device or a peripheral device in each of the example embodiments of the present invention.

Information processing device 907 or peripheral device 907 includes storage device 902, central processing unit (CPU) 903, and input/output (I/O) device 908. These elements are connected by internal bus 906. In information processing device 907, CPU 903 includes multiple processors. In information processing device 907, I/O device 908 includes a parallel port. Storage device 902 stores an operation program of CPU 903 such as programs of processor 120, data classifier 160, and computing unit 170. CPU 903 controls entirety of information processing device 907 or peripheral device 907, executes an operation program stored in storage device 902, and performs execution of a program such as programs of processor 120, data classifier 160, and computing unit 170, or data transmission/reception via I/O device 908. An internal configuration of each of the information processing device 907 or peripheral device 907 described above is an example. Peripheral device 907 may have a device configuration such that a display unit and the like are further connected.

An information processing device or a peripheral device in each of the example embodiments of the present invention described above may be implemented by a dedicated device. However, operations other than an operation of a hardware in which I/O device 908 performs communication with an outside are implementable also by a computer (information processing device). In each of the example embodiments of the present invention, I/O device 908 is, for example, an input-output unit with respect to processor 120, data classifier 160, computing unit 170, and the like. In this case, the computer reads a software program stored in storage device 902 on CPU 903, and executes the read software program on CPU 903. In a case of the above-described example embodiments, the software program may describe in such a way as to implement a function of each unit of an information processing device or a peripheral device illustrated in FIG.

1, FIG. 6, or FIG. 10 as described above. However, each unit may also include a hardware, as necessary. In such a case, it can be regarded that the software program (computer program) configures the present invention. Further, it can be regarded that a computer readable non-transitory storage medium storing the software program also configures the present invention.

In the foregoing, the present invention is exemplarily described by the above-described example embodiments and modification examples thereof. The technical scope of the present invention, however, is not limited to the scope described in the above-described example embodiments and modification examples thereof. It is clear to a person skilled in the art that various alterations or improvements are addable to the example embodiments. In such a case, a new example embodiment including the alteration or improvement may also be included in the technical scope of the present invention. This is clear by the matters described in the claims.

A part or the entirety of the above-described example embodiments may be described as the following supplementary notes, but are not limited to the following.

(Supplementary Note 1)

An information processing system includes:

an information processing device including a plurality of processors, and a common parallel port to be shared by the plurality of processors; and a peripheral device including data classification means, and computing means of a number equal to or larger than a number of the plurality of processors.

Each of the processors generates a writing unit writable by a one-time operation in a bus width of the common parallel port by appending data representing an identifier of each of the processors (hereinafter, a processor identifier) to each of a series of transfer codes capable of representing transfer target data, and successively writes the generated writing unit in the common parallel port without performing exclusive control in the common parallel port.

The data classification means successively reads the writing unit from the common parallel port, and successively outputs, to the computing means associated with data representing the processor identifier included in the read writing unit, the series of transfer codes included in the read writing unit.

And, the computing means re-constructs the transfer target data, based on the series of transfer codes output by the data classification means.

(Supplementary Note 2)

The information processing system according to supplementary note 1, wherein each of the transfer codes included in the series of transfer codes representing the transfer target data represents a value of a digit different from one another, when the transfer target data to be transmitted in a predetermined order are expressed in terms of L-adic number (where L is an integer of 2 or larger).

(Supplementary Note 3)

The information processing system according to supplementary note 1 or 2, wherein the peripheral device further includes level counters associated with data representing the processor identifier, and configured to hold data representing a nest level of interruption of each of the processors.

The processor writes, in the common parallel port, a start code being the transfer code indicating start of transferring a certain piece of transfer target data among pieces of the transfer target data, before writing of the series of transfer codes representing the certain piece of transfer target data, except for the start code.

The data classification means successively reads the writing unit from the common parallel port, increments, by 1, pieces of data representing the nest level of interruption of the level counter associated with data representing the processor identifier included in the read writing unit, when the start code is included in the read writing unit, and successively outputs, to the computing means associated with a set constituted of data representing the processor identifier included in the read writing unit, and the nest level of interruption of the level counter associated with data representing the processor identifier, the series of transfer codes being included in the read writing unit and excluding the start code.

And, the computing means re-constructs the transfer target data, based on the series of transfer codes output by the data classification means, and decrements, by 1, pieces of data representing the nest level of interruption of the level counter associated with data representing the processor identifier associated with the computing means.

(Supplementary Note 4)

The information processing system according to any one of supplementary notes 1 to 3, wherein each of the computing means is connected to an output destination different from one another, and outputs the re-constructed transfer target data to the output destination connected to the computing means.

(Supplementary Note 5)

The information processing system according to any one of supplementary notes 1 to 4, wherein the transfer target data are a code indicating a state of self test processing to be executed when the information processing device is powered on, and the peripheral device further includes display means connected to each of the computing means and configured to display the code re-constructed by the computing means.

(Supplementary Note 6)

An information processing device comprising:

a plurality of processors; and a common parallel port to be shared by the plurality of processors, wherein each of the processors generates a writing unit writable by a one-time operation in a bus width of the common parallel port by appending data representing an identifier of each of the processors (hereinafter, a processor identifier) to each of a series of transfer codes capable of representing transfer target data, and successively writes the generated writing unit in the common parallel port without performing exclusive control in the common parallel port.

(Supplementary Note 7)

A peripheral device comprising:

data classification means; and a plurality of computing means.

The data classification means successively reads, from a common parallel port included in an information processing device including a plurality of processors, and the common parallel port to be shared by the plurality of processors, a writing unit writable by a one-time operation in a bus width of the common parallel port by appending data representing an identifier of each of the processors (hereinafter, a processor identifier) included in the information processing device to each of a series of transfer codes capable of representing transfer target data to be transferred by the information processing device, and successively outputs, to the computing means associated with data representing the processor identifier included in the read writing unit, the series of transfer codes included in the read writing unit.

And, the computing means re-constructs the transfer target data, based on the series of transfer codes output by the data classification means.

(Supplementary Note 8)

A data transfer method in an information processing system is provided. The information processing system is provided with an information processing device including a plurality of processors, and a common parallel port to be shared by the plurality of processors, and a peripheral device including data classification means, and computing means of a number equal to or larger than a number of the plurality of processors. The method includes:

by each of the processors, generating a writing unit writable by a one-time operation in a bus width of the common parallel port by appending data representing an identifier of each of the processors (hereinafter, a processor identifier) to each of a series of transfer codes capable of constructing transfer target data, and successively writing the generated writing unit in the common parallel port without performing exclusive control in the common parallel port;

by the data classification means, successively reading the writing unit from the common parallel port, and successively outputting, to the computing means associated with data representing the processor identifier included in the read writing unit, the series of transfer codes included in the read writing unit; and by the computing means, re-constructing the transfer target data, based on the series of transfer codes output by the data classification means.

(Supplementary Note 9)

A non-transitory storage medium stores a data transfer program of an information processing device provided with a plurality of processors and a common parallel port to be shared by the plurality of processors. The data transfer program causes a computer included in the information processing device to execute processing of generating a writing unit writable by a one-time operation in a bus width of the common parallel port by appending data representing an identifier of each of the processors (hereinafter, a processor identifier) to each of a series of transfer codes capable of representing transfer target data, and successively writing the generated writing unit in the common parallel port without performing exclusive control in the common parallel port.

(Supplementary Note 10)

A non-transitory storage medium stores a data transfer program of a peripheral device provided with data classification means and a plurality of computing means. The data transfer program causes a computer included in the peripheral device to execute:

by the data classification means, processing of successively reading, from a parallel port included in an information processing device including a plurality of processors and the common parallel port to be shared by the plurality of processors, a writing unit writable by a one-time operation in a bus width of the common parallel port by appending data representing an identifier of each of the processors (hereinafter, a processor identifier) included in the information processing device to each of a series of transfer codes capable of representing transfer target data to be transferred by the information processing device, and successively outputting, to the computing means associated with data representing the processor identifier included in the read writing unit, the series of transfer codes included in the read writing unit; and by the computing means, processing of re-constructing the transfer target data, based on the series of transfer codes output by the data classification means.

(Supplementary Note 11)

The information processing device according to supplementary note 6, wherein each of the transfer codes included in the series of transfer codes representing the transfer target data represents a value of a digit different from one another when the transfer target data to be transmitted in a predetermined order are expressed in terms of L-adic number (where L is an integer of 2 or larger).

(Supplementary Note 12)

The peripheral device according to supplementary note 7, wherein each of the transfer codes included in the series of transfer codes representing the transfer target data represents a value of a digit different from one another when the transfer target data to be transmitted in a predetermined order are expressed in terms of L-adic number (where L is an integer of 2 or larger).

(Supplementary Note 13)

The data transfer method according to supplementary note 8, wherein each of the transfer codes included in the series of transfer codes representing the transfer target data represents a value of a digit different from one another when the transfer target data to be transmitted in a predetermined order are expressed in terms of L-adic number (where L is an integer of 2 or larger).

(Supplementary Note 14)

The non-transitory storage medium storing the data transfer program of the information processing device according to supplementary note 9, wherein each of the transfer codes included in the series of transfer codes representing the transfer target data represents a value of a digit different from one another when the transfer target data to be transmitted in a predetermined order are expressed in terms of L-adic number (where L is an integer of 2 or larger).

(Supplementary Note 15)

The non-transitory storage medium storing the data transfer program of the peripheral device according to supplementary note 10, wherein each of the transfer codes included in the series of transfer codes representing the transfer target data represents a value of a digit different from one another when the transfer target data to be transmitted in a predetermined order are expressed in terms of L-adic number (where L is an integer of 2 or larger).

This application claims the priority based on Japanese Patent Application No. 2017-009986 filed on Jan. 24, 2017, the disclosure of which is incorporated herein in its entirety by reference.

INDUSTRIAL APPLICABILITY

The present invention is usable, in an information processing device including a plurality of processors and a common parallel port to be shared by the plurality of processors, in mounting a common parallel port inside an information processing device, a common parallel port for connecting an information processing device and a peripheral device, and the like. The present invention is also usable in mounting a peripheral device for relaying data transfer between an information processing device including a plurality of processors and a common parallel port to be shared by the plurality of processors, and a controlled device to be controlled by a parallel port.

REFERENCE SIGNS LIST 100, 105, 109 Information processing system
110, 119 Information processing device
120, 129 Processor
130 Common parallel port
136, 139 Dedicated parallel port
150, 155, 156 Peripheral device
160, 165 Data classifier
170, 175 Computing unit
180 Display unit
190 Level counter
210 Controlled device
902 Storage device
903 CPU
906 Internal bus
907 Information processing device
908 I/O device

What is claimed is:

1. An information processing system comprising:
an information processing device including a plurality of processors, and a common parallel port to be shared by the plurality of processors; and
a peripheral device including a data classification unit, and computing units of a number equal to or larger than a number of the plurality of processors,
wherein each of the processors generates a writing unit writable by a one-time operation in a bus width of the common parallel port by appending data representing an identifier of each of the processors (hereinafter, a processor identifier) to each of a series of transfer codes capable of representing transfer target data, and successively writes the generated writing unit in the common parallel port without performing exclusive control in the common parallel port,
wherein the data classification unit
successively reads the writing unit from the common parallel port, and
successively outputs, to the computing unit associated with data representing the processor identifier included in the read writing unit, the series of transfer codes included in the read writing unit, and
wherein each of the computing units re-constructs the transfer target data, based on the series of transfer codes output by the data classification unit.

2. The information processing system according to claim 1, wherein
each of the transfer codes included in the series of transfer codes representing the transfer target data represents a value of a digit different from one another, when the transfer target data to be transmitted in a predetermined order are expressed in terms of L-adic number (where L is an integer of 2 or larger).

3. The information processing system according to claim 1, wherein
the peripheral device further includes level counters associated with data representing the processor identifier, and configured to hold data representing a nest level of interruption of each of the processors,
the processor writes, in the common parallel port, a start code being the transfer code indicating start of transferring a certain piece of transfer target data among pieces of the transfer target data, before writing of the series of transfer codes representing the certain piece of transfer target data, except for the start code,
wherein the data classification unit
successively reads the writing unit from the common parallel port,
increments, by 1, pieces of data representing the nest level of interruption of the level counter associated with data representing the processor identifier included in the read writing unit, when the start code is included in the read writing unit, and
successively outputs, to the computing unit associated with a set constituted of data representing the processor identifier included in the read writing unit, and the nest level of interruption of the level counter associated with data representing the processor identifier, the series of transfer codes being included in the read writing unit and excluding the start code, and
wherein each of the computing units
re-constructs the transfer target data, based on the series of transfer codes output by the data classification unit, and
decrements, by 1, pieces of data representing the nest level of interruption of the level counter associated with data representing the processor identifier associated with the computing unit.

4. The information processing system according to claim 1, wherein
each of the computing unit is connected to an output destination different from one another, and outputs the re-constructed transfer target data to the output destination connected to the computing unit.

5. The information processing system according to claim 1, wherein
the transfer target data are a code indicating a state of self test processing to be executed when the information processing device is powered on, and
the peripheral device further includes display unit connected to each of the computing unit and configured to display the code re-constructed by the computing unit.

6. A data transfer method in an information processing system provided with an information processing device, the information processing device including a plurality of processors, and a common parallel port to be shared by the plurality of processors, and provided with a peripheral device, the peripheral device including a data classification unit, and computing units of a number equal to or larger than a number of the plurality of processors, the method comprising:
by each of the processors,
generating a writing unit writable by a one-time operation in a bus width of the common parallel port by appending data representing an identifier of each of the processors (hereinafter, a processor identifier) to each of a series of transfer codes capable of constructing transfer target data, and successively writing the generated writing unit in the common parallel port without performing exclusive control in the common parallel port;

by the data classification unit, successively reading the writing unit from the common parallel port, and successively outputting, to the computing unit associated with data representing the processor identifier included in the read writing unit, the series of transfer codes included in the read writing unit; and by each of the computing units, re-constructing the transfer target data, based on the series of transfer codes output by the data classification unit.

7. The data transfer method according to claim 6, wherein each of the transfer codes included in the series of transfer codes representing the transfer target data represents a value of a digit different from one another when the transfer target data to be transmitted in a predetermined order are expressed in terms of L-adic number (where L is an integer of 2 or larger).

8. A non-transitory storage medium storing a data transfer program of an information processing device provided with a plurality of processors and a common parallel port to be shared by the plurality of processors, the data transfer program causing a computer included in the information processing device to execute processing of generating a writing unit writable by a one-time operation in a bus width of the common parallel port by appending data representing an identifier of each of the processors (hereinafter, a processor identifier) to each of a series of transfer codes capable of representing transfer target data, and successively writing the generated writing unit in the common parallel port without performing exclusive control in the common parallel port, wherein each of the transfer codes included in the series of transfer codes representing the transfer target data represents a value of a digit different from one another when the transfer target data to be transmitted in a predetermined order are expressed in terms of L-adic number (where L is an integer of 2 or larger).

9. The information processing system according to claim 2, wherein the peripheral device further includes level counters associated with data representing the processor identifier, and configured to hold data representing a nest level of interruption of each of the processors, the processor writes, in the common parallel port, a start code being the transfer code indicating start of transferring a certain piece of transfer target data among pieces of the transfer target data, before writing of the series of transfer codes representing the certain piece of transfer target data, except for the start code, wherein the data classification unit successively reads the writing unit from the common parallel port, increments, by 1, pieces of data representing the nest level of interruption of the level counter associated with data representing the processor identifier included in the read writing unit, when the start code is included in the read writing unit, and successively outputs, to the computing unit associated with a set constituted of data representing the processor identifier included in the read writing unit, and the nest level of interruption of the level counter associated with data representing the processor identifier, the series of transfer codes being included in the read writing unit and excluding the start code, and wherein each of the computing units re-constructs the transfer target data, based on the series of transfer codes output by the data classification unit, and decrements, by 1, pieces of data representing the nest level of interruption of the level counter associated with data representing the processor identifier associated with the computing unit.

10. The information processing system according to claim 2, wherein each of the computing unit is connected to an output destination different from one another, and outputs the re-constructed transfer target data to the output destination connected to the computing unit.

11. The information processing system according to claim 3, wherein each of the computing unit is connected to an output destination different from one another, and outputs the re-constructed transfer target data to the output destination connected to the computing unit.

12. The information processing system according to claim 2, wherein the transfer target data are a code indicating a state of self test processing to be executed when the information processing device is powered on, and the peripheral device further includes display unit connected to each of the computing unit and configured to display the code re-constructed by the computing unit.

13. The information processing system according to claim 3, wherein the transfer target data are a code indicating a state of self test processing to be executed when the information processing device is powered on, and the peripheral device further includes display unit connected to each of the computing unit and configured to display the code re-constructed by the computing unit.

14. The information processing system according to claim 4, wherein the transfer target data are a code indicating a state of self test processing to be executed when the information processing device is powered on, and the peripheral device further includes display unit connected to each of the computing unit and configured to display the code re-constructed by the computing unit.

* * * * *